United States Patent
Lee et al.

(10) Patent No.: US 11,914,145 B2
(45) Date of Patent: Feb. 27, 2024

(54) FLOATING HOLOGRAM SYSTEM USING HOLOGRAPHIC OPTICAL ELEMENT

(71) Applicant: KWANGWOON UNIVERSITY INDUSTRY-ACADEMIC COLLABORATION FOUNDATION, Seoul (KR)

(72) Inventors: Seung Hyun Lee, Namyangju (KR); Lee Hwan Hwang, Incheon (KR); Jae Hyun Lee, Seoul (KR); Sung Jae Ha, Seoul (KR); Soon Chul Kwon, Seoul (KR); Kwang Pyo Hong, Seoul (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 414 days.

(21) Appl. No.: 17/285,851

(22) PCT Filed: Dec. 10, 2020

(86) PCT No.: PCT/KR2020/018002
§ 371 (c)(1),
(2) Date: Apr. 15, 2021

(87) PCT Pub. No.: WO2022/124446
PCT Pub. Date: Jun. 16, 2022

(65) Prior Publication Data
US 2022/0397761 A1 Dec. 15, 2022

(30) Foreign Application Priority Data
Dec. 9, 2020 (KR) .................. 10-2020-0171264

(51) Int. Cl.
G03H 1/22 (2006.01)
G02B 27/01 (2006.01)
G02B 5/32 (2006.01)

(52) U.S. Cl.
CPC .......... G02B 27/0103 (2013.01); G02B 5/32 (2013.01); G03H 1/2205 (2013.01); G03H 2001/2213 (2013.01); G03H 2223/14 (2013.01)

(58) Field of Classification Search
None
See application file for complete search history.

(56) References Cited

U.S. PATENT DOCUMENTS 8,766,879 B2 * 7/2014 Fujikawa .......... G02B 27/0101
359/13
2005/0030603 A1 2/2005 Takemori et al.
(Continued)

FOREIGN PATENT DOCUMENTS

JP 2016-133629 A 7/2016
JP 2017032947 A 2/2017
(Continued)

OTHER PUBLICATIONS

Notice of Rejection for KR10-2020-0171264 by Korean Intellectual Property Office dated Aug. 16, 2022.

*Primary Examiner* — Jennifer D. Carruth
(74) *Attorney, Agent, or Firm* — BROADVIEW IP LAW, PC

(57) ABSTRACT

Disclosed in the present invention is a floating hologram system. The floating hologram system includes a diffuser configured to form a projection image using light beams transmitted from an image transmitter and diffuse the formed image, and a holographic optical element on which the image diffused from the diffuser is incident and which generates a virtual image floating at a position a predeter- (Continued)

mined distance therefrom and has a convex lens characteristic. A distance between the diffuser and the holographic optical element is determined based on a focal length of the holographic optical element and a distance from the holographic optical element to the virtual image.

7 Claims, 6 Drawing Sheets

(56) References Cited

U.S. PATENT DOCUMENTS

| | | | |
|---|---|---|---|
| 2019/0041641 A1* | 2/2019 | Christmas | G02B 27/102 |
| 2020/0026077 A1* | 1/2020 | Christmas | G02B 5/1809 |
| 2020/0393792 A1* | 12/2020 | Kumar | G02B 5/32 |

FOREIGN PATENT DOCUMENTS

| | | |
|---|---|---|
| KR | 1020140091252 A | 7/2014 |
| KR | 10-2017-0037891 A | 4/2017 |
| KR | 1020180073513 A | 7/2018 |
| KR | 101901985 B1 | 11/2018 |
| KR | 10-2148876 B1 | 6/2020 |

\* cited by examiner

[Fig. 1]
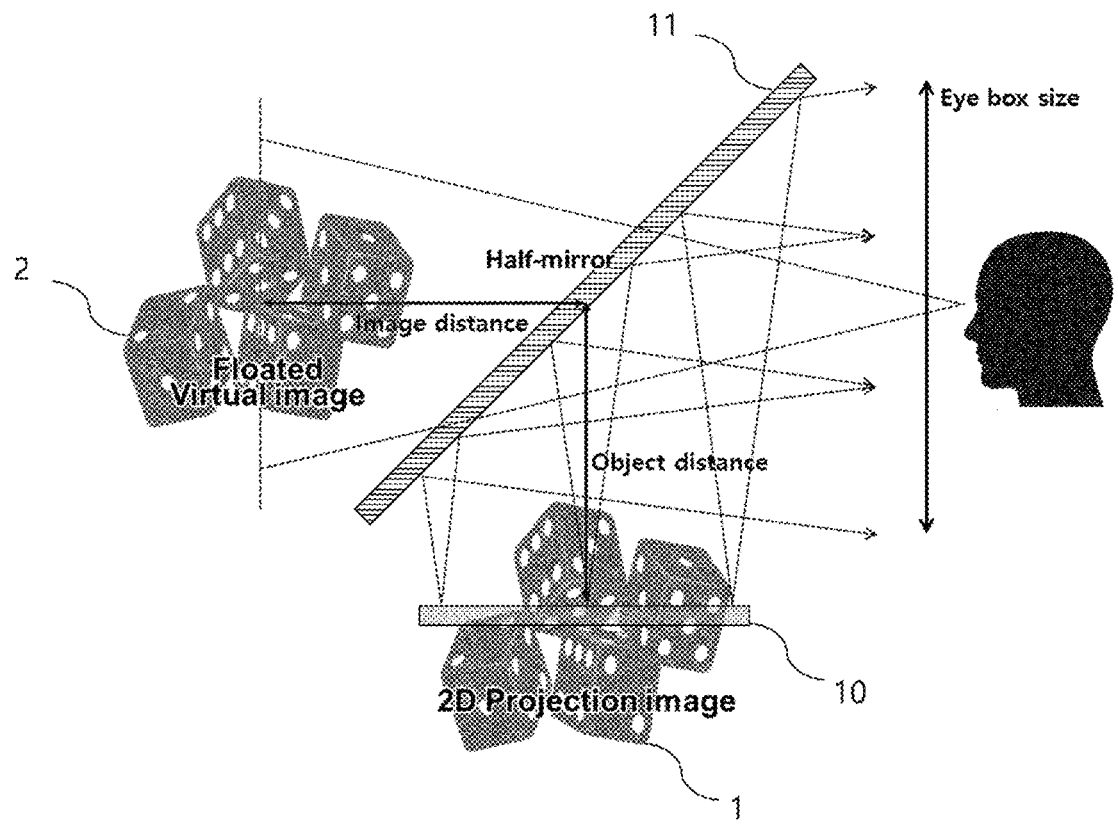
[Fig. 2]
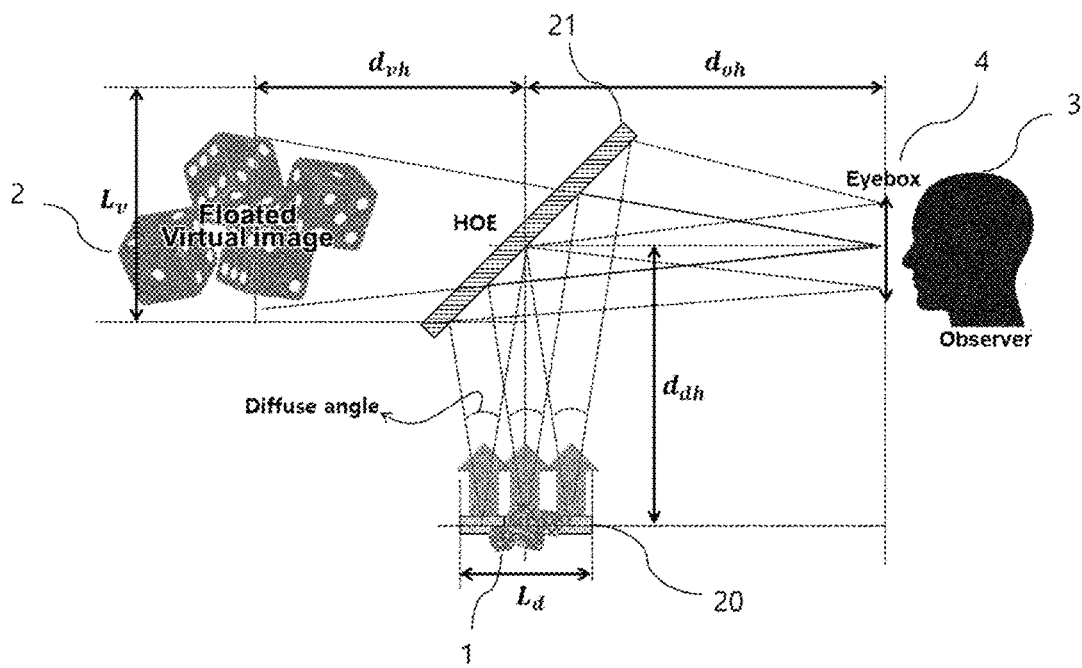

[Fig. 3A]
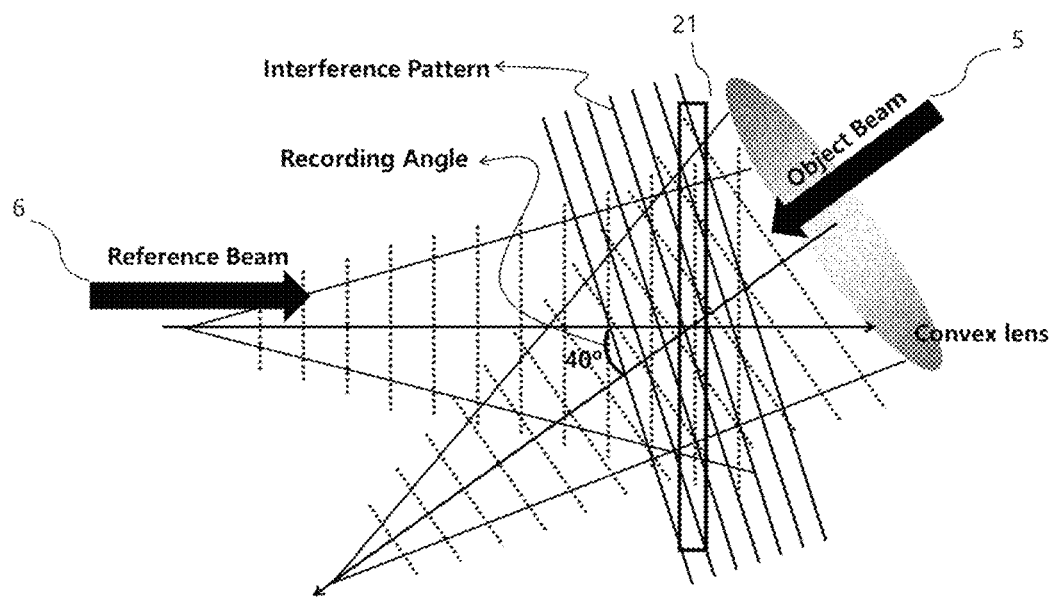
[Fig. 3B]
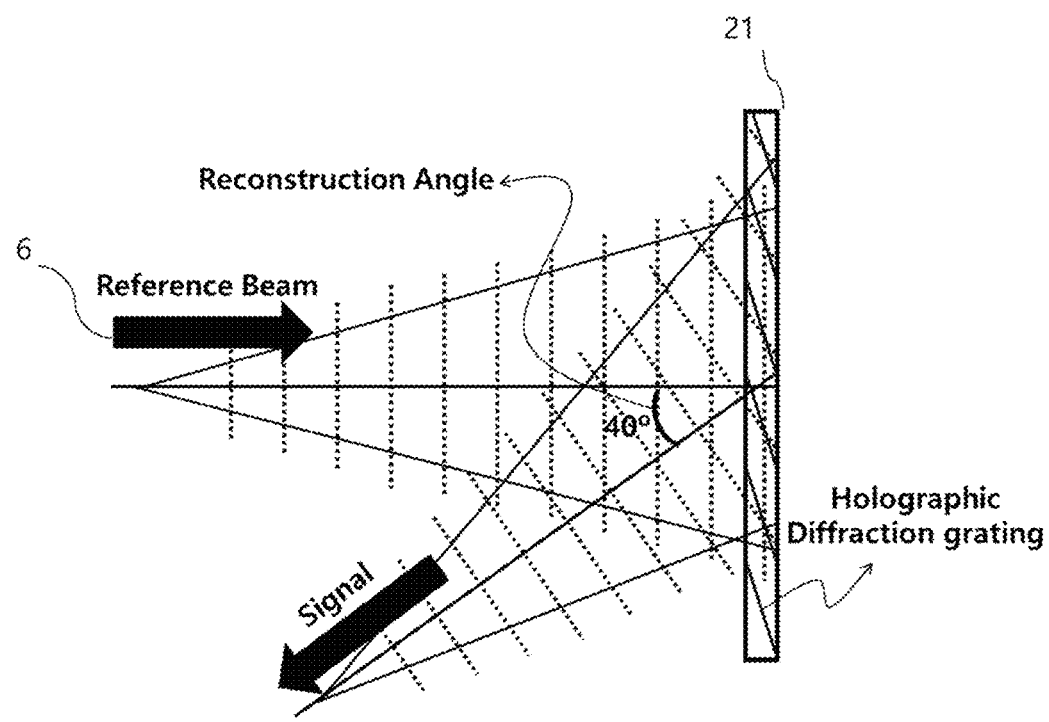

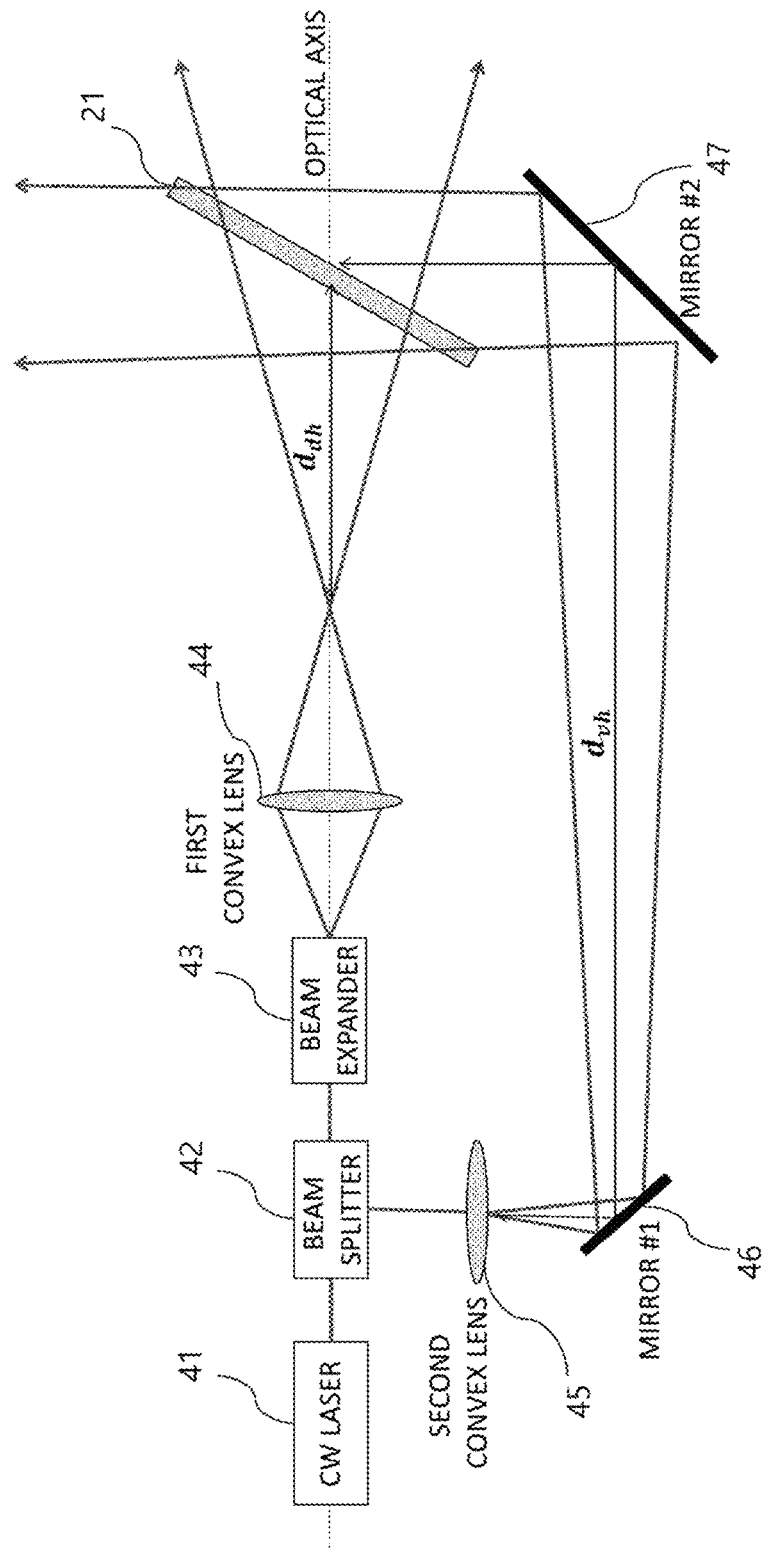
[Fig. 4]

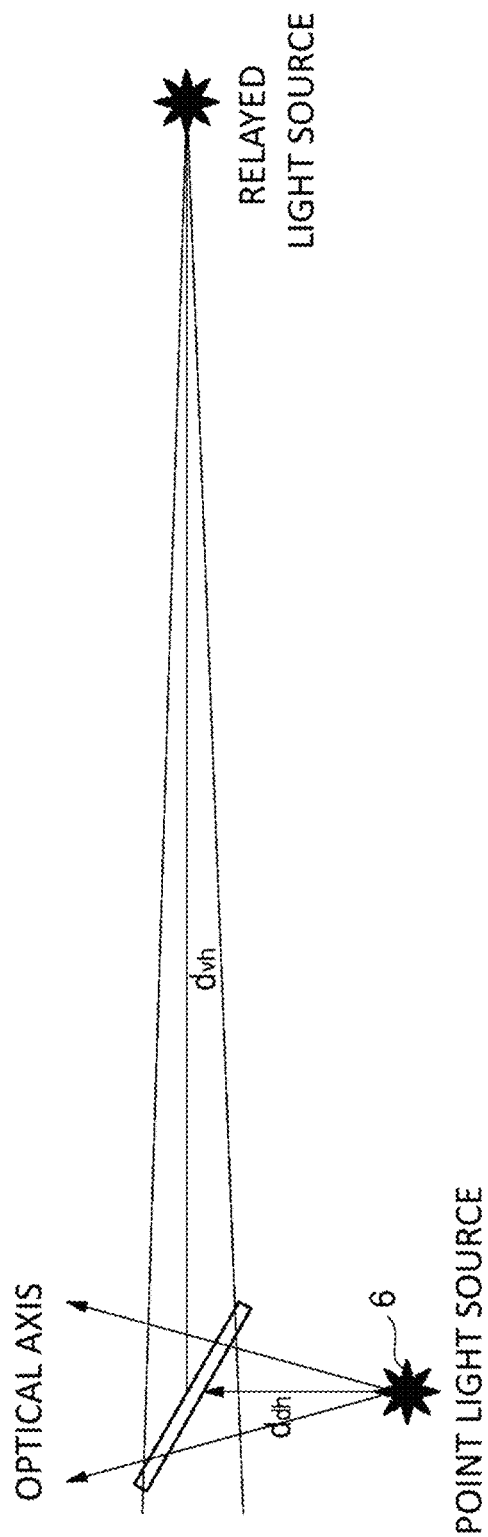

[Fig. 6]
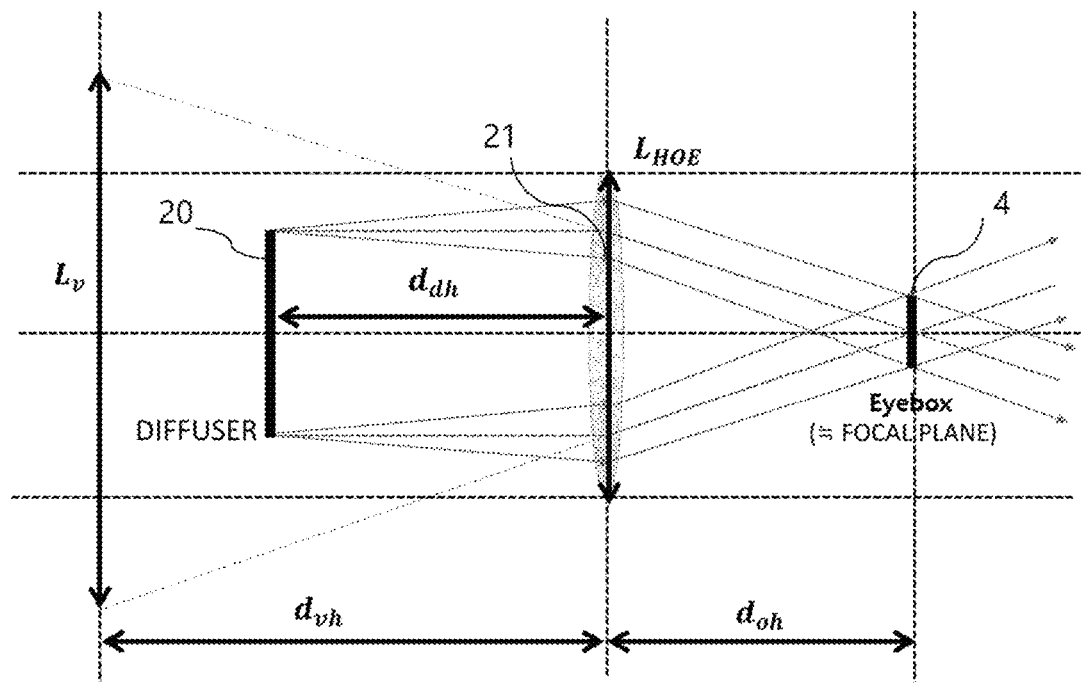

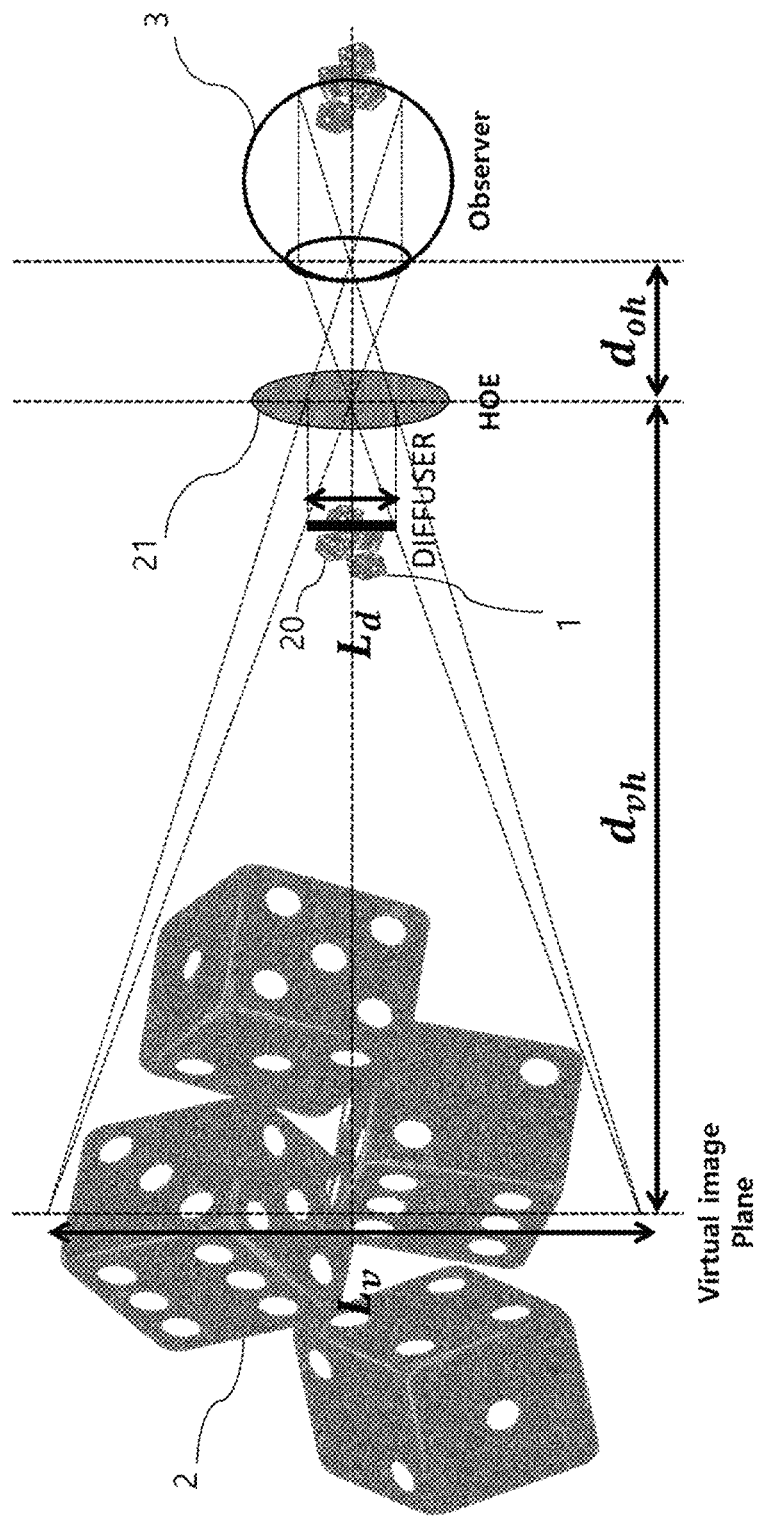

FLOATING HOLOGRAM SYSTEM USING HOLOGRAPHIC OPTICAL ELEMENT

TECHNICAL FIELD

The present invention relates to a floating hologram system, and more particularly, to a floating hologram system using a holographic optical element.

BACKGROUND ART

Recently, hologram technologies are next-generation image technologies that allow virtual images to be recognized as real subjects, research and development thereon have been actively progressing, and the hologram technologies are employed in various application fields. In a floating hologram among the hologram technologies, a two-dimensional (2D) image is projected on a reflection plate to show a virtual image to an observer. In the floating hologram, a transparent screen, such as a half mirror or foil, is generally used to project a 2D image into a space.

FIG. 1 is a schematic view illustrating a conventional floating hologram system. Referring to FIG. 1, in the conventional floating hologram system, a 2D projection image 1 which is projected from an image transmitter, for example, a projector (not illustrated), and formed on a display 10 is implemented as a virtual image 2 through a transparent screen 11, for example, a half mirror. In the floating hologram system, a ratio of a size of an input image to a size of an output image is a ratio of 1:1, and an image depth of the virtual image is equal to a distance between the display 10 and the transparent screen 11. Therefore, in order to make the image larger, the display 10 and the transparent screen 11 also should be disposed so as to be farther apart, and thus there are many restrictions in expressing image floating and image depth. Particularly, a sense of depth of an image is calculated as the distance between the transparent screen 11 and the display 10, and thus there is a structural problem in that the display and the transparent screen should be disposed far apart in order to provide a high sense of depth of the image when a hologram system is manufactured.

DISCLOSURE

Technical Problem

The present invention is directed to providing a method of solving structural problems that exist in manufacturing a hologram system for providing high-depth, large-screen augmented content using a holographic optical element.

The present invention is also directed to providing a method of theoretically analyzing a size of a restructured virtual image through light beam tracing and then theoretically calculating a size and depth of the virtual image, and an improved floating hologram system using the same.

Technical Solution

One aspect of the present invention provides a floating hologram system. The system includes a diffuser configured to form a projection image using light beams transmitted from an image transmitter and configured to diffuse the formed image, and a holographic optical element on which the image diffused from the diffuser is incident and which generates a virtual image floating at a position a predetermined distance therefrom and has a convex lens characteristic. A distance between the diffuser and the holographic optical element is determined based on a focal length of the holographic optical element and a distance from the holographic optical element to the virtual image.

A size of the virtual image may be determined based on a size of the image formed by the diffuser, the focal length of the holographic optical element, and the distance from the holographic optical element to the virtual image.

The size of the virtual image may be a length of any one axis of the virtual image, and the size of the image formed by the diffuser may be a length of any one axis of the image.

The focal length of the holographic optical element may have a lens formula relationship between the distance between the diffuser and the holographic optical element and the distance from the holographic optical element to the virtual image.

The distance between the diffuser and the holographic optical element may be determined based on the focal length of the holographic optical element and the distance from the holographic optical element to the virtual image according to an equation.

A size of the virtual image may be determined based on a size of the image formed by the diffuser, the focal length of the holographic optical element, and the distance from the holographic optical element to the virtual image according to an equation.

The focal length of the holographic optical element may approximate a distance from the holographic optical element to an eye box of an observer.

The holographic optical element may have a size sufficient for receiving all the light beams diffused from the diffuser.

Advantageous Effects

According to the present invention, it is possible to solve problems that exist in expressing a sense of depth and realizing a large-screen image in a conventional floating hologram system and to more easily realize large-screen content with higher immersion.

DESCRIPTION OF DRAWINGS

FIG. 1 is a schematic view illustrating a conventional floating hologram system.

FIG. 2 is a view illustrating a floating hologram system according to an embodiment of the present invention.

FIGS. 3A and 3B are views illustrating holographic optical element (HOE) recording and reproducing principles according to an embodiment of the present invention.

FIGS. 4 and 5 are views for describing a method of manufacturing an HOE according to an embodiment of the present invention.

FIG. 6 is a view illustrating an equivalent model of the floating hologram system of FIG. 2.

FIG. 7 is a view illustrating an equivalent model of tracing of an image light beam enlarged from an HOE, according to an embodiment of the present invention.

MODES OF THE INVENTION

Hereinafter, embodiments of the present invention that can be easily performed by those skilled in the art will be described in detail with reference to the accompanying drawings. However, the embodiments of the present invention may be implemented in several different forms and are not limited to the embodiments described herein. In addition, parts irrelevant to description are omitted in the drawings in order to clearly explain the present invention. Similar parts are denoted by similar reference numerals throughout this specification.

FIG. 2 is a view illustrating a floating hologram system according to an embodiment of the present invention. Referring to FIG. 2, a two-dimensional (2D) projection image 1 projected from an image transmitter, for example, a projector (not illustrated) is formed on an optical diffuser 20, and the optical diffuser 20 diffuses point sources constituting the projected 2D projection image 1. Diffused light beams reconstruct an image through a holographic optical element (HOE) 21. In the reconstructed image, point sources are gathered so that one virtual image 2 is generated at a predetermined distance. The HOE 21 may serve as an existing aspherical convex lens so that an optical path may be relatively freely designed. Since the HOE 21 serves as a transparent screen, an external environment may be projected so that an observer 3 may observe a reality in which the external environment and an augmented reality (AR) image are mixed.

Hereinafter, numerical analysis applied to the present invention is performed based on a lens formula, that is, Equation 1, by default.

$$\frac{1}{d_o} + \frac{1}{d_i} = \frac{1}{f} \qquad \text{[Equation 1]}$$

In Equation 1, $d_o$ denotes the distance (an object distance) between the display 10 (corresponding to the optical diffuser 20 of FIG. 2) and the transparent screen 11 (corresponding to the HOE 21 of FIG. 2) in FIG. 1, $d_i$ denotes the distance (an image distance) from the transparent screen 11 to the virtual image 2, and f denotes the focal length of the transparent screen 11.

As can be seen from Equation 1, the image distance di may be adjusted by adjusting the focal length f Therefore, for a high depth of the image, it is not necessary to configure a system volume to be huge by moving the display 10 away from the transparent screen 11 as in the prior art of FIG. 1. As illustrated in FIG. 2, when the HOE 21 with refractive power of a lens, instead of the transparent screen 11, serves as a convex lens, a size of the image may also be further increased by increasing a size of the display at a predetermined distance and depth, and thus the enlarged image may be provided to the observer 3. Therefore, it is not necessary to enlarge the virtual image 2 by increasing the size of the hologram system itself.

In FIG. 2, a maximum angle at which light beams are diffused from the optical diffuser 20 is calculated so that the HOE 21 has a size in which all the diffused light beams may be input to the HOE 21. When the optical diffuser 20 is located too far from the HOE 21, the HOE 21 may not receive all the light beams diffused from the optical diffuser 20 and thus an amount of light is reduced. Conversely, when the optical diffuser 20 is located too close to the HOE 21, an eye box 4 is reduced and thus it is difficult to observe the virtual image 2.

In FIG. 2, $L_v$ denotes a length of one axis of the virtual image 2 floated by the HOE 21. $L_d$ denotes a length of one axis of the 2D projection image 1 formed by the optical diffuser 20. $d_{dh}$ denotes a distance from the optical diffuser 20 to the HOE 21. $d_{oh}$ denotes a distance from the eye box 4 of the observer 3 to the HOE 21, and $d_{vh}$ denotes a distance from the HOE 21 to the floated virtual image 3.

FIGS. 3A and 3B are views illustrating HOE recording and reproducing principles according to an embodiment of the present invention. Referring to FIG. 3A, an object beam 5, which is reflected and incident due to shining light beams on a subject, and a reference beam 6, which is directly incident from a light source, meet and are merged at a predetermined angle difference so that interference occurs, and an interference pattern is stored (recorded) in the HOE 21. Further, as illustrated in FIG. 3B, since the HOE 21 may record optical refractive power in a medium, an image may be reproduced to have the refractive power of the lens without change while being recorded when a signal is transmitted to the HOE 21 by accurately matching a distance, a diffusion angle, and a wavelength of light in a direction of the reference beam 6 used in the manufacturing of the HOE 21. A depth of the floated virtual image 2 is determined when the HOE 21 is manufactured. A method of recording a hologram of the HOE 21 for manufacturing a floating hologram is as follows.

FIGS. 4 and 5 are views for describing a method of manufacturing an HOE according to an embodiment of the present invention. Referring to FIG. 4, a light beam emitted from a laser 41 is split into two light beams through a beam splitter 42. One of the light beams passes through a beam expander 43, passes through a first convex lens 44, and then is focused on a point and emitted again, and thus becomes a reference beam 6 which regards the point as a starting point. The other light beam passes through a second convex lens 45 and, at the same time, forms an image at a point at which the light beam is emitted, and the light beam acts as an object beam 5.

As illustrated in FIG. 5, when a point source is applied to the reference beam 6, the light beam is refracted from an HOE 21, which is a hologram medium, and an image is formed near the starting point of the second convex lens, as described in FIG. 4. That is, when a light source is input at a position at which the focus is formed on the first convex lens 44 and then the light beam is emitted again, the image is formed at a position at which the light beam is emitted from the second convex lens 45. Such a principle is the same as a principle in which a lens forms an image.

FIG. 6 is a view illustrating an equivalent model of the floating hologram system of FIG. 2. Referring to FIG. 6, it can be seen that the distance from the eye box 4 to the HOE 21 is identical to a focal length of the HOE 21. $d_{dh}$ denotes the distance from the optical diffuser 20 to the HOE 21, and when the distance $d_{oh}$ from the eye box 4 of the observer 3 to the HOE 21 is determined and the distance $d_{vh}$, which is a position at which the virtual image 2 is floated, is determined, the distance $d_{dh}$ may be obtained with reference to Equation 1, which is a lens formula. The HOE 21 applied in the present invention serves to refract the reflected light beam, unlike a conventional lens. Therefore, in order to more easily understand tracing of the light beam which is reflected by the optical diffuser 20 to form the eye box 4, the optical diffuser 20 (see FIG. 2) located at a lower side is moved to an opposite side of the HOE 21 and is aligned with one axis to form an equivalent model. However, there are two assumptions here. A first assumption is that the HOE 21 may approximate a thin lens and a second assumption is that there is no spherical aberration. Under the above assumptions, when a central light beam is considered, the eye box 4 is formed near a focal plane of the HOE 21 as illustrated in the equivalent models of FIG. 3. Strictly speaking, although the eye box 4 is not exactly formed on the focal plane, there may be aberrations that are sufficient so as not to interfere with visual display. Based on the above assumptions and the lens formula of Equation 1, the focal length of the HOE 21 and the distance $d_{dh}$ may be defined using Equation 2 and Equation 3. In Equation 1, the distance $d_o$ is the distance $d_{vh}$ as the object beam, but when a direction of the reference beam is set to (+) according to the lens conventions, the opposite side of the lens (the HOE 21) becomes (−), and $d_o=−d_{vh}$. Further, since the reference beam is (+), $d_i=d_{dh}$. As a result, Equation 2 and Equation 3 may be derived.

$$f_{HOE} = \frac{d_{vh} \times d_{dh}}{d_{vh} - d_{dh}}$$ [Equation 2]

$$d_{dh} = \frac{f_{HOE} \times d_{vh}}{f_{HOE} + d_{vh}}$$ [Equation 3]

FIG. 7 is a view illustrating an equivalent model of tracing of an image light beam enlarged from an HOE according to an embodiment of the present invention. Referring to FIG. 7, when it is assumed that the HOE 21 may approximate a thin lens, a distance $d_{oh}$ from the eye box 4 of the observer 3 to the HOE 21 is equal to a focal length $f_{HOE}$. Therefore, it can be seen that a length $L_d$ (i.e., a size of a 2D projection image), of one axis of the 2D projection image formed by the optical diffuser 20 is proportional to the distance $d_{oh}$ from the eye box 4 of the observer 3 to the HOE 21 and the distance $d_{vh}$ from the HOE 21 to a virtual image 2. This may be summarized as in Equation 4 below.

$$d_{oh}: L_d = d_{vh}: L_v$$ [Equation 4]

Therefore, the length ($L_d$) (i.e., the size of the virtual image) of one axis of the virtual image floated by the HOE may be obtained using Equation 5 below.

$$L_v = \frac{L_d d_{vh}}{d_{oh}}$$ [Equation 5]

Although various embodiments of the present invention have been described above, these various embodiments do not necessarily need to be implemented alone, and two or more embodiments may be combined. While the embodiments of the present invention have been described above in detail, the scope of the present invention is not limited thereto but encompasses several modifications and improvements by those skilled in the art using basic concepts of the embodiments of the present invention defined by the appended claims.

The invention claimed is:

1. A floating hologram system comprising:
   a diffuser configured to form a projection image using light beams transmitted from an image transmitter and configured to diffuse the formed image; and
   a holographic optical element on which the image diffused from the diffuser is incident and which generates a virtual image floating at a position a predetermined distance therefrom and has a convex lens characteristic,
   wherein a distance between the diffuser and the holographic optical element is determined based on a focal length of the holographic optical element and a distance from the holographic optical element to the virtual image, wherein a size ($L_v$) of the virtual image is determined based on a size ($L_d$) of the image formed by the diffuser, the focal length ($d_{oh}$) of the holographic optical element, and the distance ($d_{vh}$) from the holographic optical element to the virtual image according to an equation of $$L_v = \frac{L_d d_{vh}}{d_{oh}}.$$

2. The floating hologram system of claim 1, wherein a size of the virtual image is determined based on a size of the image formed by the diffuser, the focal length of the holographic optical element, and the distance from the holographic optical element to the virtual image.

3. The floating hologram system of claim 2, wherein the size of the virtual image is a length of any one axis of the virtual image, and
   the size of the image formed by the diffuser is a length of any one axis of the image.

4. The floating hologram system of claim 2, wherein the focal length of the holographic optical element approximates a distance from the holographic optical element to an eye box of an observer.

5. The floating hologram system of claim 1, wherein the focal length of the holographic optical element has a lens formula relationship between the distance between the diffuser and the holographic optical element and the distance from the holographic optical element to the virtual image.

6. The floating hologram system of claim 1, wherein the distance ($d_{dh}$) between the diffuser and the holographic optical element is determined based on the focal length ($f_{HOE}$) of the holographic optical element and the distance ($d_{vh}$) from the holographic optical element to the virtual image according to an equation of $$d_{dh} = \frac{f_{HOE} \times d_{vh}}{f_{HOE} + d_{vh}}.$$

7. The floating hologram system of claim 1, wherein the holographic optical element has a size sufficient for receiving all the light beams diffused from the diffuser.

\* \* \* \* \*